United States Patent Office 2,997,480
Patented Aug. 22, 1961

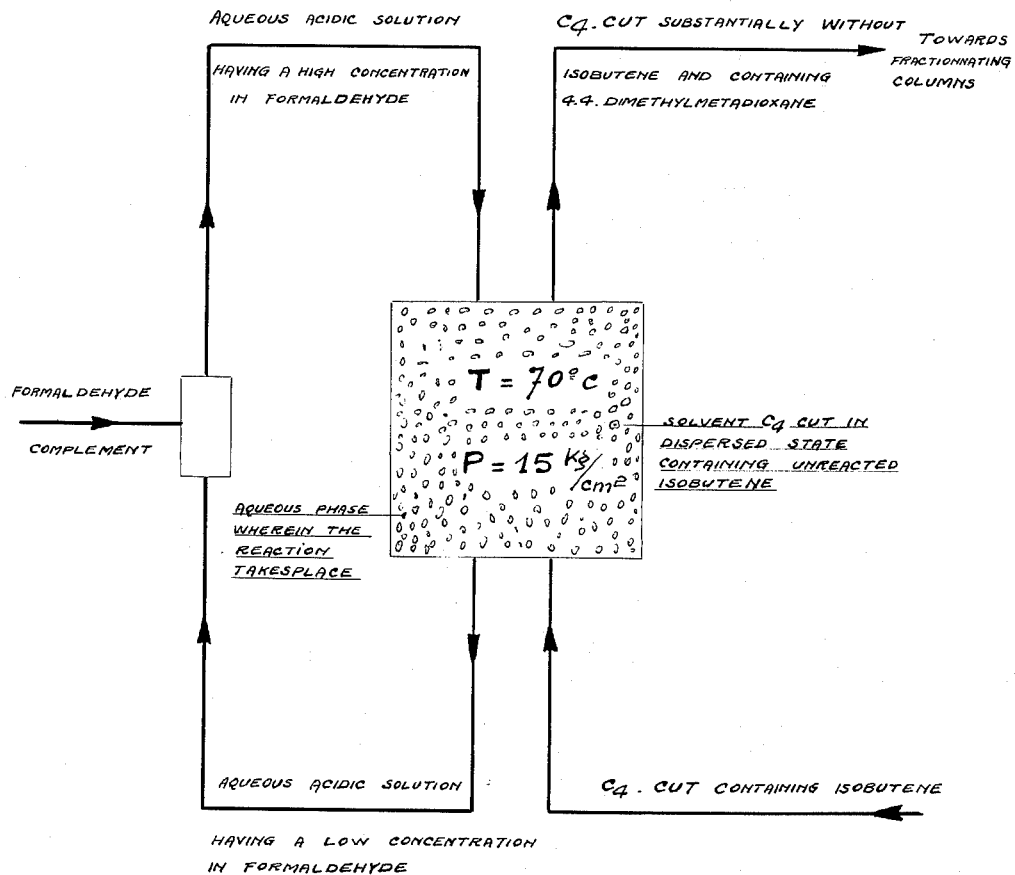

2,997,480
PROCESS FOR MAKING 4,4-DIMETHYL-METADIOXANE
Michel Charles Ferdinand Hellin, Rueil-Malmaison, and Fernand Charles Coussemant, Paris, France, assignors to Institut Francais du Petrole des Carburants et Lubrifiants, Rueil-Malmaison, France
Filed Mar. 4, 1959, Ser. No. 797,275
1 Claim. (Cl. 260—340.7)

This invention relates to a process for making 4,4-dimethylmetadioxane.

This application is a continuation-in-part of our pending patent application S.N. 722,848, filed March 21, 1958.

It is known in the art to produce 4,4-dimethylmetadioxane by means of the condensation of pure isobutene with formaldehyde, eventually in the presence of paraffinic hydrocarbons, which do not participate in the reaction.

This known process suffers from the drawback that it requires, as a preliminary measure, the preparation of pure isobutene. For when a mixture consisting of hydrocarbons having less than five carbon atoms per molecule as well as isobutene and other olefins is reacted to obtain 4,4-dimethylmetadioxane, it is not possible to separate the latter product in a satisfactory manner from the other dioxane byproducts of the reaction, either by distillation or extraction with solvents. Moreover, such treatment leads to considerable losses of formaldehyde due to the condensation of the latter with the other olefins in the mixture.

It is, however, much more interesting from an industrial point of view, to produce 4,4-dimethylmetadioxane from a mixture of hydrocarbon compounds, in which the various hydrocarbons have less than 5 carbon atoms per molecule, and contain varying amounts of isobutene and eventually other olefinic hydrocarbons in mixture with paraffinic hydrocarbons, than to produce the aforesaid dioxane from pure isobutene. Thus far, it has not been possible in the art to separate the desired 4,4-dimethylmetadioxane satisfactorily from the other dioxanes and other byproducts either by distillation or by extraction with solvents, nor has it been possible to avoid the considerable losses of formaldehyde, which are caused by the condensation of the latter with the olefins other than isobutene, present in the mixture, and which losses make the process uneconomical.

The permanent losses of formaldehyde during all of the known methods make the same particularly uneconomical, for the formaldehyde is the most expensive starting reactant in the whole process.

We have carefully studied the reactions involved in the condensation of the aforesaid hydrocarbon mixture with formaldehyde in an aqueous medium and with a strong acid as the condensation catalyst. The reaction which leads to the desired formation of 4,4-dimethylmetadioxane can be represented by the following equation:

(1) 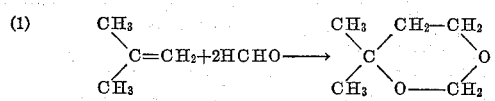

However, the formation of this dioxane is accompanied or even dominated, by other reactions leading to the formation of byproducts which it has not been possible to eliminate satisfactorily in the hitherto known modes of carrying out the process. Thus, other dioxanes, diols, alcohols, are formed with the other olefins present in the hydrocarbon starting mixture, as well as further condensation products.

In the starting materials which are most easily available, namely the cracking fraction containing either $C_4$ compounds alone, or a mixture of $C_3$ and $C_4$ compounds, there are contained paraffinic hydrocarbons such as butane, isobutane and propane, as well as olefinic hydrocarbons apart from isobutene, namely, butene-1, butene-2, propylene.

The various olefinic compounds in this latter type of starting materials react with formaldehyde in the manner described above, the most important competing reactions being that of 4.5 dimethylmetadioxane formation according to the equation:

(2) 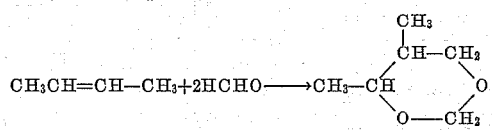

that of 4 ethylmetadioxane formation according to a similar equation, that of tertiary butyl alcohol formation according to the equation:

(3) 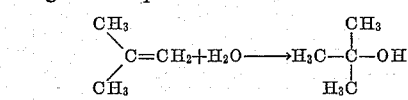

and that of methyl 3 butanediol 1-3 according to the equation:

(4) 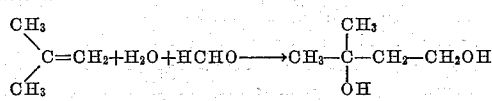

The formation of alcohols and diols derived from the olefins other than isobutene is negligible.

It is, therefore, an object of our invention to provide a process for producing 4,4-dimethylmetadioxane material from the above described type of mixed hydrocarbon starting, by condensation with formaldehyde, in which process the competing reactions of tertiary butyl alcohol and methyl 3 butane diol 1-3 formation are substantially suppressed and the formation of dioxane is favored.

It is another object of our invention to provide a process as described as the above object, which permits to obtain a pure or substantially pure 4,4-dimethylmetadioxane at an optimal hourly yield rate and in easily separable form, preferably in a continuous process, and with a minimum loss of formaldehyde through competing reactions.

It is still another object of our invention to provide a process for obtaining 4,4-dimethylmetadioxane as substantially the only reaction product from a hydrocarbon mixture of the type described and formaldehyde.

These objects are attained and the drawbacks of the known art avoided by our invention, which provides for a process of forming 4,4-dimethylmetadioxane from an isobutene-containing mixed hydrocrabon starting material of the kind described, with formaldehyde on the basis of our discovery that it is possible to steer the reaction in such a manner that substantially exclusively isobutene in the starting material is permitted to react with formaldehyde under formation of the desired end product, while all other side reactions as stated above are substantially slowed down or completely suppressed.

The process according to our invention thus comprises the steps of carrying out the reaction of the gaseous or liquid mixture of hydrocarbons having less than five carbon atoms per molecule and containing isobutene near other olefins and paraffins with an aqueous acid-containing solution of formaldehyde, in which there are introduced either from the start or gradually during the reaction, at least more than two and preferably from four to ten and more moles of HCHO per mole of isobutene to be reacted, and wherein the ratio of HCHO to H₂O is preferably maintained between 1:4 and 1:2 parts by weight throughout the reaction, while the acid employed is a strong acid such as sulfuric or phosphoric acid, present in the solution in a ratio relative to H₂O of from $1/15$ to 1 for sulfuric acid or from $1/4$ to 5 for phosphoric acid, these ratios being chosen preferably of from $1/7$ to $1/2$ for the former acid and from $2/3$ to 1 for the latter.

It is critical, in order to avoid the above-mentioned formation of alcohols as an undesirable byproduct of the reaction, to provide for an excess of formaldehyde above the stoichiometrically required two moles per mole of isobutene in the reaction medium. Thus, while it may sometimes be sufficient to have a slight excess of HCHO present, we prefer to operate with an excess of from 4 to 10 and sometimes up to 100 moles of formaldehyde instead of the 2 moles stoichiometrically required for the formation of the desired dioxane derivative from each mole of isobutene.

The presence of this excess of formaldehyde has no uneconomical effect on the process, since no undue losses of HCHO occur, only the above-mentioned two moles of HCHO per mole of isobutene being consumed during the reaction. The excess of formaldehyde is to be maintained substantially at the same level throughout the reaction by gradual addition of the same in replacement of the quantities of HCHO consumed in the formation of the end product.

If the operation is carried out continuously, the replacement of consumed formaldehyde can take place during the recycling of the aqueous solution.

As has been mentioned above, the amount by weight of water in the aqueous formaldehyde solution should be preferably twice to four times the amount of formaldehyde, and should in fact, not exceed ten times that amount, since such large amounts of water would favor the undesirable formation of tertiary butyl alcohol and methyl 3 butane diol 1-3. On the other hand, the amount of water should not be less than equal to the amount of formaldehyde in the solution, since otherwise, the yield of 4,4-dimethylmetadioxane would be strongly decreased in favor of heavier products containing oxygen bridges of the other type C—O—C.

Furthermore, if the acid employed is sulfuric acid, the amount thereof present in the formaldehyde-water mixture should be from 5 to 35% by weight, while if phosphoric acid is used, about 15 to 75% by weight of the aforesaid mixture should be present therein as $H_3PO_4$.

Strong acids in the meaning of this application are acids conventionally known as such, i.e. having a dissociation constant equal to or greater than that of the first acidic function of phosphoric acid ($K \geqslant 10^{-2}$). In each case the acid concentration should be chosen in order to obtain a value from 0 to —2 for the acidity function $H_0$ as defined and measured by L. P. Hammett (Journal American Chem. Soc., 56, 827, 1934).

Other conditions to be observed during the process according to our invention are a temperature range preferably between 55 and 75° C., and the temperature should not exceed 85°C. nor be substantially below room temperature. Too low a temperature would reduce the reaction velocity to such a degree that the hourly yield rate of 4,4-dimethylmetadioxane would be unduly reduced and the process would become uneconomical. This yield rate could also not be increased by augmenting the acid concentration in the reaction medium, because this would lead to a partial decomposition of the desired end product already during the reaction, and the formation of undesirable byproducts which it would be very difficult to separate from the end product, apart from the undesirable reduction of the yield.

On the other hand, it is also necessary to observe the above stated lower limits of acid concentration in order to obtain a satisfactory hourly yield rate.

An increase in temperature beyond the above stated critical limit would lead to a carbonization of the reaction products and consequently to an impure product.

As can be seen from the aforegoing explanations, we have discovered that, in order to obtain a selective predominance of the formation of 4,4-dimethylmetadioxane leading to a substantially pure final product, a number of critical conditions must be observed, among which there are:

(1) The ratio of formaldehyde to isobutene present in the starting material, and
(2) The ratio of formaldehyde to water, and
(3) The ratio of acid to water during the reaction, and
(4) The temperature at which the reaction is carried out.

Further important conditions to be observed if maximum yields are to be obtained, comprise the application of a total pressure throughout the reaction, which is in excess of the prevailing atmospheric pressure sufficiently that the partial pressure of isobutene is 0.02 to 15 atmospheres; the total pressure thus depends largely on the exact composition of the starting hydrocarbon mixture. As the reaction velocity of the desired 4,4-dimethylmetadioxane formation increases in proportion to the pressure applied up to a maximum value obtained when the pressure is sufficient to have the hydrocarbon starting material in a liquid state, it is more convenient to apply this latter pressure and accordingly to operate in liquid phase.

Formaldehyde as used in the process of our invention includes its polymeric forms such as paraformaldehyde. However, when paraformaldehyde is to be used as a source, we depolymerize the same in a separate step and introduce the resulting formaldehyde preferably in the recycled aqueous phase.

For this purpose, paraformaldehyde is depolymerized to formaldehyde in a conventional depolymerization plant. We have found it undesirable to introduce paraformaldehyde directly into the reaction column, contrary to what has been conventional practice when working, for instance, with pure isobutene as the starting material. By introducing only previously depolymerized formaldehyde we avoid the process of three phases, namely solid paraformaldehyde, organic liquid and aqueous acidic liquid phase in the interior of the reactor column. Three phase chemical reactions are notoriously difficult to realize.

We have further discovered that the yield of 4,4-dimethylmetadioxane with regard to the consumed formaldehyde can be noticeably improved, if the concentration of the reaction products present in the aqueous phase, in which the reaction takes place substantially exclusively throughout the operation of the process, is continuously reduced.

This is achieved by a continuous removal of the desired end product as it is formed, by providing for the permanent presence of a second phase in contact with the aqueous reaction phase, in which second phase the desired 4,4-dimethylmetadioxane must be much more soluble, than in water, as shall be explained in more detail further below.

By carrying out the process of formation of the desired dioxane under the above enumerated conditions, it is possible to determine the reaction velocity and consequently to interrupt the reaction as soon as the isobutene in the starting material has either completely reacted with formaldehyde, or so high a proportion of the isobutene has reacted that a continuation of the reaction to convert the remaining isobutene would be uneconomical. Thus, it may be advisable to interrupt the reaction before the entire isobutene has been reacted with formaldehyde, and thereby to obtain an exceptionally pure end product.

The purity of the 4,4-dimethylmetadioxane attainable in practice, depends to a certain extent on the rate of isobutene present in the starting material. Assuming that the reaction is allowed to continue until at least 95% and up to 99.5% of the isobutene present in the starting material has been reacted, and the latter contains more than 45% of isobutene, the resulting 4,4-dimethylmetadioxane contains only from about 1 to 2.5% of other dioxanes. If the starting material contains between 20 to 45% of isobutene, and the reaction is carried out to a conversion of 95% of the available isobutene, the resulting metadioxane product still contains only from 1 to 4% of other dioxanes.

It is generally desirable to interrupt the reaction of isobutene with formaldehyde, when about 95 to 99.5% of isobutene have been converted, as the reacting of the last remainders of isobutene is extremely slow and is accompanied by parallel reactions of the other olefins contained in the hydrocarbon starting mixture, the reaction products of which then become incorporated as undesirably large amounts of other dioxanes in the final product.

If the above-mentioned undesired dioxane content of up to 2.5% is not considered inadmissible, the conversion of isobutene from a starting mixture containing at least 45% of the same, may be continued until about 99.7 to 99.8% of the isobutene have been reacted with formaldehyde, and a most satisfactory yield of 4,4-dimethylmetadioxane can be obtained.

The preferred mode of carrying out the process according to our invention is based on our above-described discovery that the yield rate of 4,4-dimethylmetadioxane relative to the amount of consumed formaldehyde can be increased by providing for a continuous removal of the reaction products from the aqueous phase as the same are formed, so that secondary reactions of the formaldehyde with these reaction products in the aqueous phase under formation of heavier undesirable products is prevented; recovery of formaldehyde from these heavier products being practically impossible under economical conditions.

According to this preferred mode of operation, the reaction products, namely 4,4-dimethylmetadioxane accompanied by low amounts of diols, alcohols and other dioxanes, are continuously transferred from the aqueous phase in which they are being formed to an adjacent organic phase which latter phase is continuously removed from the reaction as the phase is laden with the reaction products, and replaced by a fresh organic phase.

This continuously renewed organic phase is constituted by the "inert" hydrocarbons contained in the starting mixture of aliphatic hydrocarbons having an average content of less than five carbon atoms per molecule and containing, besides isobutene, at least one other component selected from the group consisting of olefinic and mixtures of olefinic and paraffinic hydrocarbons of the aforesaid average carbon number.

Under the optimal reaction conditions according to the invention which have been set forth in detail hereinbefore, the "inert" hydrocarbons of the aforesaid mixture (which shall be referred to hereinafter for the sake of brevity as the "$C_4$-fraction"), i.e. the hydrocarbons not participating to any substantial degree in the reaction with formaldehyde in the aqueous phase, comprise the paraffinic and the olefinic components other than isobutene, in the $C_4$-fraction.

Under these optimal reaction conditions, the $C_4$-fraction thus serves simultaneously as source for one of the two principal reactants in the formation of 4,4-dimethylmetadioxane, and as solvent for the latter desired end product. This is only made possible due to the selectivity of the process according to our invention, whereby the isobutene in the $C_4$-fraction reacts substantially exclusively with the formaldehyde of the aqueous phase, while the other "inert" hydrocarbons act as the solvents for the 4,4-dimethylmetadioxane. The "inert" hydrocarbons laden with the latter end product are continuously withdrawn from the contact with the aqueous reaction phase, while fresh $C_4$-fraction, containing isobutene, is continuously brought into contact with the aqueous phase.

Optimal results are obtained by using a $C_4$-fraction as starting material in this preferred mode of operation, in which the weight ratio of "inert" hydrocarbons to isobutene is at least equal to 1:1 or higher.

If this should not be the case in a $C_4$-fraction to be treated, the above ratio can always be established by adding to the $C_4$-fraction the necessary amount of inert hydrocarbons, preferably, in the form of butane which is easily available from the well-known "topping" of crude petroleum.

The preferred mode of operation is thus simpler to carry out in practice than the other modes of operation described hereinbefore, since the step of forming 4,4-dimethylmetadioxane and extracting the same, which are carried out seperately and successively as described above can now be carried out simultaneously and in a single operation.

It is, therefore, no longer necessary to effect subsequent extraction of the reaction products, which extraction required a separate extractor plant apart from the reactor, in particular if the process is to be carried out continuously.

The preferred mode of operation, therefore, achieves a double advantage of increasing the yield relative to the consumed formaldehyde and permits simplification of the apparatus.

All conventional liquid-liquid extraction plants can be used for carrying out the process according to our invention. It is preferred to use those establishing the best contact between the two liquid phases which contain the reactants whereby the passage of isobutene from the organic phase to the aqueous phase as well as the extraction of 4,4-dimethylmetadioxane from the aqueous phase to the organic phase are facilitated.

The necessary intimate contact between the two phases can be obtained in different ways, for instance, the process according to the invention can be carried out in one or several reactors adapted for total agitation of the contents thereof, the volume or volumes of which reactors are calculated so as to maintain a very precisely determinable contact time between the two phases. The process can also be carried out in a tubular reactor which can be operated with a flow of the reactants in one and the same direction, so that the two liquid phases are introduced at the same end of the tube and flow in the same direction toward the other tube end, or the process can be carried out in a tubular reactor through which the reactants flow counter-currently to each other, so that the aqueous phase is introduced, for instance, at the upper end and the organic phase at the lower end of the vertically disposed reactor. This is the preferred mode of operation.

The dispersion of the organic phase in the aqueous phase can be ensured in all the aforesaid cases either by a mechanical agitation device such as, for instance, a pulsating column, or by a stationary device constituted, for instance, by a filling of the tubular reactor with Raschig rings.

Each of the aforesaid reactor systems offers certain technological advantages of its own. Thus, the first-mentioned reactor constitutes the simplest structure, the tubular reactor with parallel flow of the reactants permits to obtain higher flow rates, while the preferred counter-currently operated system permits to operate with small reaction volumes.

We have, however, discovered, that the best yield rates are obtianed when using the last-mentioned counter-current system, since the same has the effect of creating gradients of concentration in opposite sense in the two liquid phases moving counter-currently to each other. Thereby the organic phase can act most effectually as extracting agent in the removal of the reaction products from the reaction zone immediately upon their formation. The relative amounts of reactants, acid and water, remain unchanged in the preferred mode of operating the process according to our invention; the same applies essentially to the conditions of temperature and pressure, These conditions must, of course, be so chosen as to maintain the reactants in the liquid phase.

At the end of the reaction, if the process according to the invention is carried out discontinuously, or while the reaction is in progress, if that process is carried out continuously, the organic phase which entrains the reaction products, is subjected to a fractionated distillation, whereby there are obtained in separate fractions, firstly, the unreactive portion of the starting hydrocarbon mixture, secondly the tertiary butanol, thirdly the 4,4-dimethylmetadioxane and traces of other dioxanes and, thirdly, the other reaction products such as, above all methyl-(3)-butanediol-(1,3), and the heavier products, the latter being present in a very low proportion only.

This separation by fractionated distillation is easy to carry out because, under the conditions of the process according to the invention, the organic phase contains only a negligible amount of formaldehyde and an amount of acid which is too small to cause any noticeable carbonization of the organic products.

In carrying out the process according to the invention by the preferred mode of operation, the simultaneous reaction cycle and extraction step are maintained continuous owing to a regular introduction of fresh hydrocarbon starting mixture into the tubular reactor and owing to a controlled injection of currently required amounts of formaldehyde to the aqueous phase. It would not be useful to recycle the organic phase constituted by a $C_4$-fraction. One of the fractions gained from the distillation column is a mixture consisting of unreacted isobutene and hydrocarbon solvents, having an average carbon number of 4, a mixture which is perfectly adapted for use as liquefied gas in the same manner as the initial $C_4$-fraction.

It is preferred to limit the conversion rate of isobutene to the order of 90% by weight, in order to obtain a 4,4-dimethylmetadioxane of a high degree of purity; the degree of purity corresponds to the ratio of 4,4-dimethylmetadioxane to the total amount of dioxanes formed.

The process of the invention shall be further illustrated by a number of examples, which are, however, not to be considered as limitative of the scope of the invention, in any way or form.

EXAMPLE I

A starting mixture containing 504 grams (9 moles) of isobutene and 504 g. (9 moles) of butene-1 is treated by means of vigorous bubbling in a closed work cycle, with an aqueous acidic formaldehyde solution consisting of 3731 g. of water, 1510 g. of HCHO and 519 g. of $H_2SO_4$ at a temperature of 60° C. and at atmospheric pressure. The number of formaldehyde moles at the start is more than five times that of isobutene moles available in the reaction. About 2.5 times as much water in weight is contained in the water-HCHO-acid system as there is formaldehyde present, and the acid content is almost 10% in weight of the combined amounts of water and formaldehyde.

While the reaction is in progress, the formaldehyde content of the reaction medium is checked every ten minutes and the formaldehyde consumed during the reaction is replaced by the addition of further HCHO, until, after about 166 minutes, approximately 570 g. of formaldehyde have been added, thus bringing the total HCHO amount to 2080 g. or about eight times the number of isobutene moles.

In the meantime, the mixture is constantly and intimately brought into contact with the aqueous medium due to the bubbling.

After the above time of about 2 hours 45 minutes about 99% of the total amount of isobutene present in the starting mixture have reacted with formaldehyde, while the absorption of formaldehyde by butene-1 is practically negligible, amounting to only 1.55% of the initial amount of the latter olefin.

The reaction products are then extracted from the reaction mixture by means of 2 liters of cyclohexane, and the various extracted products separated from each other and from the solvent by fractional distillation.

The following fractions are obtained:

(1) 927 g. of 4,4-dimethylmetadioxane having a purity of 98.4%, which corresponds to a yield of 87.2% of the pure product relative to the isobutene amount present, and 82.5% with regard to the formaldehyde consumed during the reaction.

(2) 15 g. approximately, of condensation products of butene-1, consisting mainly of ethyl-4-metadioxane, (3) 27.5 g. of tertiary butyl alcohol, and (4) 30.2 g. of methyl-3-butanediol 1-3, both byproducts of the isobutene condensation, and (5) 147 g. of a heavier residue of higher molecular weight condensation products.

EXAMPLE II

A starting mixture containing 830 g. of isobutene (14.8 moles) and 900 g. butene-2 (16.1 moles) is treated in the same manner as described in Example I, with an aqueous acidic solution containing 1505 g. (about 50 moles) of formaldehyde and 1470 g. of sulfuric acid $H_2SO_4$ in mixture with 3325 g. of water at a temperature of 20° C., and under atmospheric pressure.

At the start, the number of formaldehyde moles is more than three times as large as that of isobutene. 2.2 times as much water in weight is present in the reaction medium as there is formaldehyde present, the acid content being about 30% in weight of the combined amounts of water and formaldehyde.

As the reaction proceeds, check tests are made every ten minutes to determine the formaldehyde consumption, and new formaldehyde is introduced to maintain the formaldehyde concentration in the reaction medium constant throughout the reaction. This requires about 1000 g. of formaldehyde which are added gradually during a period of about 5 hours and 40 minutes, at which time about 99% of the isobutene present in the starting mixture have reacted with formaldehyde, while competing reaction of formaldehyde with butene-2 amounts to only 3.8% of the total amount of the latter.

While this constitutes a slightly higher participation of the other olefinic constituent, leading to the formation of condensation products which consist chiefly of 4,5-dimethylmetadioxane, than is the case in Example I, the condensation products of isobutene are substantially the same as in the preceding example.

Extraction of the end products from the reaction mixture by means of 3 liters of decahydronaphthalene, and subsequent fractioned distillation lead to 1520 g. of 4,4-dimethylmetadioxane having a degree of purity of 96%, and constituting a yield of 85% relative to the initial amount of isobutene, and of 82.5% relative to the formaldehyde consumed during the reaction.

EXAMPLE III

As starting material, there is used a gaseous cracking cut of gas oil, consisting of an average number of four carbon atoms per molecule. Analysis by means of infra-red rays, and chromatography in the vapor phase yield the following composition of the cut:

| Hydrocarbons: | Percent by weight |
|---|---|
| n-Butane and isobutane | 12 |
| Isobutene | 25 |
| Butene-1 | 31 |
| Butene-2 | 30 |
| Hydrocarbons with 3 and 5 carbon atoms per molecule | 2 |
| Total | 100 |

5 kilograms (kg.) of this cracking cut are treated in an autoclave having a capacity of 50 liters and provided with an automatic shaking device, with a solution of 2040 g. of formaldehyde and 1980 g. $H_2SO_4$ in 4480 g. of water, at a temperature of 60° C. in an autoclave and under a pressure of about 7 kg./cm.² There result in the autoclave two liquid phases which are intimately mixed by shaking the autoclave vigorously.

The consumption rate of HCHO is determined for instance, every 10 minutes by conventional analysis on samples of the reacting mixture, and a constant concentration of the formaldehyde is maintained by bleeding some of it into the autoclave at the aforesaid intervals. In the course of about 85 minutes, approximately 1460 g. of formaldehyde have been added to the reaction medium, the total number of formaldehyde moles being 117, and therefore, about five times as many moles of formaldehyde are introduced as there are moles of isobutene present in the starting material (about 22.3 moles).

After the above-mentioned time of 85 minutes, 99% of the total available isobutene have reacted with formaldehyde, while only 2.9% and 1.5% respectively of butene-2 and butene-1 have reacted.

The reaction products are then extracted with four liters of cyclohexane, and separated by fractional distillation. The main fraction is constituted by 2320 g. of 4,4-dimethylmetadioxane having a degree of purity of 95%, the impurities being essentially 4,5-dimethylmetadioxane and 4-ethylmetadioxane, while the byproducts of isobutene condensation are in the amount of about 240 g. consisting mostly of methyl-3-butanediol-1,3. The yield of pure 4,4-dimethylmetadioxane is, therefore, 86% of the theoretical amount based on the reacted isobutene.

EXAMPLE IV

Example I is repeated, but the reaction is interrupted after 96 minutes, as soon as 90% of the isobutene present in the starting material have been converted. While accepting the loss of 10% of isobutene, the 4,4-dimethylmetadioxane thus obtained has a purity of 99.2% instead of only 98.4% purity in Example I.

EXAMPLE V

Example II is carried out under the same conditions as described, but the reaction is interrupted after 192 minutes. At this time, only 90% of the isobutene present in the starting mixture have reacted. However, the purity of the finely obtained 4,4-dimethylmetadioxane is 97.8% instead of only 96% as in Example II.

EXAMPLES VI TO X

Example III is repeated under exactly the same conditions as set forth above. However, the reaction period is interrupted at earlier stages of isobutene conversion with a corresponding increase in the purity of the desired end product, 4,4-dimethylmetadioxane, as compiled in the following Table I:

Table I

| Example No. | Percent of Isobutene reacted | Duration of Reaction with HCHO, min. | Purity of End product (percent) |
| --- | --- | --- | --- |
| VI | 72 | 26 | 98.0 |
| VII | 84 | 36 | 97.7 |
| VIII | 88 | 42 | 97.2 |
| IX | 92.5 | 50 | 96.5 |
| X | 96 | 60 | 96.0 |
| (III) | 99 | 85 | 95) |

EXAMPLE XI

Example I is repeated, under the conditions set forth above. However, instead of sulfuric acid, the aqueous acidic reaction mixture contains 1900 g. of $H_3PO_4$. Cetane is used as the extraction solvent instead of cyclohexane. The results of this treatment are the same as in Example I.

EXAMPLE XII

Example II is repeated, but instead of sulfuric acid phosphoric acid is introduced into the solution in such amounts that the latter contains 3280 g. of $H_3PO_4$. The reaction takes place with a slightly inferior reaction velocity due to the larger volume of acidic solution and the ensuing weaker concentration of formaldehyde.

EXAMPLE XIII

A $C_4$-fraction obtained by a conventional thermic reforming process is caused to flow through a reaction column in counter-current flow to an aqueous acidic solution of formaldehyde. The two phases which are continuously fed into the reactor have the following compositions in percent by weight:

Organic phase:
  Propene _____ 0.24
  Propane _____ 2.3
  Isobutane _____ 6.75
  Isobutene _____ 23.4
  Butene-(1) _____ 17.6
  n-Butane _____ 31.6
  trans-Butene-(2) _____ 10
  cis-Butene-(2) _____ 8.2
Aqueous phase:
  Water _____ 70
  Formaldehyde _____ 21
  $H_2SO_4$ _____ 9

The reactor is constituted by a pulsated column having perforated baffle plates. The column may have a diameter of 4 centimeters (cm.) and a height of 6 meters (m.). The column is caused to pulsate or oscillate at a frequency of, for instance, 100 cycles, and an amplitude, in longitudinal direction, of 25 millimeters (mm.), whereby the $C_4$-fraction is continuously being dispersed in the formaldehyde solution. There would be no inconvenience in effecting an inverted dispersion of the formaldehyde solution in the $C_4$-fraction.

The temperature of the reaction medium is held at about 70° C. throughout the entire height of the column and a pressure of about 14 kg./cm.² is maintained in the interior of the column by means of applying a partial pressure of nitrogene, whereby the $C_4$-fraction is maintained in the liquid phase. The $C_4$-fraction is introduced at the base of the column at a flow rate of 3510 grams (g.) per hour, which corresponds to about 6 liters (l.) per hour. The residual hydrocarbon fraction, containing dissolved reaction products is withdrawn continuously from the top of the column and subjected to a fractionated distillation, whereby the various reaction products are separated from each other.

The acidic aqueous solution is circulated in a closed cycle. The solution is introduced continuously at the top of the column at a flow rate of for instance, 6846 g., which corresponds to about 6 l. per hour, and is withdrawn at the base of the column, charged with a very small amount of reaction products, which is negligible compared with the amount of these products extracted in the organic phase. The withdrawn acid aqueous formaldehyde solution is returned to the top of the column by way of a depolymerization plant in which the solution is charged with fresh formaldehyde to the extent necessary to replace the loss of the latter, and the solution which has thus been brought to its original concentration of HCHO is then reintroduced into the top of the column.

The frequency and amplitude of the oscillations of the column are so controlled as to effect a conversion of about 90% of the isobutene present in the starting material.

A balance of the materials determined with the aqueous and organic phases at the entrance and the exit of the column reveals that, for instance, for a consumption of formaldehyde of 721.2 g. per hour the absorbed isobutene amounts to 739.2 g. per hour; the absorption of the other olefins contained in the C₄-fraction is negligible owing to the voluntary limitation of the conversion rate for the isobutene to about 90%.

Under these conditions a yield of 1324.5 g. per hour of 4,4-dimethylmetadioxane is obtained, which corresponds to a yield rate of 86.5% relative to the isobutene and of 95% relative to the formaldehyde introduced hourly into the reaction. The other products of the reaction of isobutene with the formaldehyde solution are tertiary butanol at a yield of 50 g. per hour, methyl-(3)-butanediol-(1,3) at a yield of 59 g. per hour, and solvent residues at a yield of 74 g. per hour.

Table I shows that, while always operating within the conditions according to our invention, it is possible to determine, at will, the degree of purity of the end product by correspondingly interrupting the reaction prior to a substantially complete conversion of the isobutene present in the starting material.

It is understood that hydrocarbon mixtures having as an average less than five carbon atoms per molecule, and containing isobutene as well as other olefinic hydrocarbons, may be used as starting materials for obtaining 4,4-dimethylmetadioxane by the process according to our invention, regardless of the proportions of the various constituents.

The process according to the invention is schematically illustrated in the accompanying drawing.

It will be understood that while there have been given herein certain specific examples of the practice of this invention, it is not intended thereby to have this invention limited to or circumscribed by the specific details of materals, proportions or conditions herein specified, in view of the fact that this invention may be modified according to individual preference or conditions without necessarily departing from the spirit of this disclosure and the scope of the appended claim.

This application is a continuation-in-part of our pending patent application S.N. 722,848, filed March 21, 1958.

What is claimed is:

In a continuous process for producing 4,4-dimethyl-metadioxane from a starting mixture of aliphatic hydrocarbons having an average content of less than 5 carbon atoms per molecule and consisting of isobutene and another member selected from the group consisting of: olefinic hydrocarbons and mixtures of olefinic hydrocarbons with paraffinic hydrocarbons, comprising the steps of: reacting said starting mixture at a temperature between 10 and 85° C. and under a pressure of at least one atmosphere, in an aqueous solution of a strong inorganic acid having a dissociation constant of at least equal to $10^{-2}$, having added thereto an amount of formaldehyde above the stoichiometrically required two moles per mole of isobutene present in the starting mixture, said acid being present in amounts of 5 to 75% by weight of the total amount of water and formaldehyde, maintaining throughout the reaction a ratio by weight of water to formaldehyde in the range of 1:1 to 10:1 by gradually adding formaldehyde to said aqueous solution of strong inorganic acid in replacement of the quantities of formaldehyde consumed in the reaction; separating the organic layer from the aqueous solution as soon as the major portion of the total amount of isobutene has reacted with the formaldehyde; and isolating 4,4-dimethylmetadioxane, the improvement of carrying out said gradual addition of formaldehyde to said aqueous solution of strong inorganic acid by removing reacted aqueous solution of strong inorganic acid from the reaction zone, then contacting said reacted aqueous solution of strong inorganic acid with paraformaldehyde in a region outside from the reaction zone, so as to substantially restore the formaldehyde content of said solution to its initial level, and recycling the resulting solution into said reaction zone.

References Cited in the file of this patent

UNITED STATES PATENTS

| | | |
|---|---|---|
| 2,158,031 | Loder | May 9, 1939 |
| 2,335,691 | Mottern | Nov. 30, 1943 |
| 2,362,307 | Ritter | Nov. 7, 1944 |
| 2,368,494 | Rosen et al. | Jan. 30, 1945 |
| 2,504,732 | Rosen et al. | Apr. 18, 1950 |